(12) United States Patent
Hiramatsu et al.

(10) Patent No.: US 7,824,765 B2
(45) Date of Patent: Nov. 2, 2010

(54) POROUS OBJECT BASED ON SILICON CARBIDE AND PROCESS FOR PRODUCING THE SAME

(75) Inventors: Takuya Hiramatsu, Nagoya (JP); Kenji Morimoto, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/193,961

(22) Filed: Aug. 19, 2008

(65) Prior Publication Data

US 2009/0029103 A1    Jan. 29, 2009

Related U.S. Application Data

(63) Continuation of application No. PCT/JP2007/051506, filed on Jan. 30, 2007.

(30) Foreign Application Priority Data

Feb. 22, 2006   (JP)   ............... 2006-045417

(51) Int. Cl.
    *B32B 3/26*   (2006.01)
(52) U.S. Cl. .............. 428/312.6; 428/317.7; 428/317.9; 428/446; 423/439; 501/80; 501/88
(58) Field of Classification Search .............. None
    See application file for complete search history.

(56) References Cited

U.S. PATENT DOCUMENTS

| | | |
|---|---|---|
| 2003/0134084 A1 | 7/2003 | Ichikawa et al. |
| 2004/0051196 A1 | 3/2004 | Otsuka et al. |
| 2005/0140069 A1 | 6/2005 | Ichikawa |
| 2005/0158534 A1 | 7/2005 | Tabuchi et al. |
| 2007/0082174 A1 | 4/2007 | Masukawa et al. |
| 2007/0225149 A1 | 9/2007 | Hayashi et al. |

FOREIGN PATENT DOCUMENTS

EP    1 588 995 A1    10/2005

(Continued)

OTHER PUBLICATIONS

Jan. 27, 2010 Office Action issued in U.S. Appl. No. 12/194,015.
Ozcivici et al., Fabrication and Characterization of Ceramic Foams Based on Silicon Carbide Matrix and Hollow Alumino-Silicate Spheres, Journal of the American Ceramics Society, Dec. 1, 2005, pp. 3338-3345, vol. 88, No. 12, Blackwell Publishing, Malden, MA, USA.

(Continued)

*Primary Examiner*—Ling Xu
(74) *Attorney, Agent, or Firm*—Oliff & Berridge, PLC

(57) ABSTRACT

A silicon carbide-based porous article comprising silicon carbide particles as an aggregate, metallic silicon and an aggregate derived from siliceous inorganic particles to form pores through volume shrinkage by heat treatment, wherein the porosity is 45 to 70%, and the average pore diameter is 10 to 20 μm is provided. Also provided is a method for producing a silicon carbide-based porous article, comprising; adding inorganic particles to form pores through volume shrinkage by heat treatment to a raw-material mixture containing silicon carbide particles and metallic silicon, then forming into an intended shape, calcinating and firing the resultant green body, forming pores through volume shrinkage of the inorganic particles by heat treatment, and the shrunk inorganic particles being present as an aggregate in the porous article.

3 Claims, 1 Drawing Sheet

FOREIGN PATENT DOCUMENTS

| | | |
|---|---|---|
| JP | A 6-182228 | 7/1994 |
| JP | A-2001-206785 | 7/2001 |
| JP | A 2002-201082 | 7/2002 |
| JP | A-2003-238271 | 8/2003 |
| JP | A-2003-342076 | 12/2003 |
| WO | WO 03/082770 A1 | 10/2003 |
| WO | WO 2005/089901 A1 | 9/2005 |
| WO | WO 2005/090263 A1 | 9/2005 |

OTHER PUBLICATIONS

Feb. 12, 2010 Supplementary European Search Report issued in Application No. 07707724.6-2111 / 2006261 PCT/JP2007051506.

POROUS OBJECT BASED ON SILICON CARBIDE AND PROCESS FOR PRODUCING THE SAME

This is a Continuation of International Application No. PCT/JP2007/051506 filed Jan. 30, 2007, which claims the benefit of Japanese Application No. 2006-045417 filed Feb. 22, 2006. The disclosure of the prior applications is hereby incorporated by reference herein in its entirety.

TECHNICAL FIELD

The present invention relates to a silicon carbide-based porous article suitable for use as a material constituting mainly a filter for purification of automobile exhaust gas, a catalyst carrier or the like, and to a method for producing the same.

BACKGROUND ART

A porous honeycomb structure constituted by cell partition walls (ribs) forming an assemblage of a plurality of cells adjacent to each other and a honeycomb outer wall surrounding and holding the outermost cells constituting the circumference of the assemblage of cells is in wide use as a filter (a diesel particulate filter, i.e. a DPF) for trapping and removing the particulate matter contained in a particle-containing fluid such as diesel engine exhaust gas or a catalyst carrier for carrying a catalyst component for purification of harmful substance in exhaust gas. Also, development works are being pushed forward for a DPF (a DPF for catalyst regeneration) which comprises an oxidation catalyst carried on a conventional DPF and which can oxidize and burn the particulate matter deposited on the catalyst to continuously regenerate the catalyst. Refractory silicon carbide (SiC) is in use as one of the constitutional materials.

As such a honeycomb structure, for example, there is disclosed a porous silicon carbide-based catalyst carrier of honeycomb structure which is obtained in such way that silicon carbide as a starting material having a desired specific surface area and containing impurities is formed into an article of intended shape, dried, then fired in a temperature of 1600 to 2200° C. (see, e.g. Patent Document 1).

In the case of the catalyst carrier disclosed in Patent Document 1, in sintering (necking) by the recrystallization reaction of the silicon carbide particle per se, the silicon carbide component vaporizes from the surface of the silicon carbide particles and condensates at the contact area (necks) between the silicon carbide particles, thereby the necks grow to result in a bonded state. However, the vaporization of silicon carbide requires a very high firing temperature, which has invited high costs, and a material of high thermal expansion coefficient must be fired at a high temperature, which has led to a drawback of a low firing yield.

Also, when it is attempted to produce a filter of high porosity, particularly high porosity of 50% or more by the above-mentioned sintering in the recrystallization reaction of the silicon carbide particle per se, the sintering mechanism does not function sufficiently, thus the growth of necks is hindered, which has led to a drawback of a low strength of the resultant filter.

As the conventional technique to solve these problems, there is disclosed a porous honeycomb structure containing fire resistant particles of aggregate, particularly silicon carbide and metallic silicon, and the production method (see, e.g. Patent Document 2). According to such production method, a porous honeycomb structure can be produced at relatively low firing temperatures and low costs, one with high thermal conductivity and high strength can be obtained. Also, in compounding, addition of a pore former enables a resultant porous honeycomb structure to be high porosity.

High porosity is desired for such honeycomb structure from the viewpoint of lowering pressure loss. As a method for making a honeycomb structure to be higher porosity, there is a method where organic pore formers such as starch and foaming resin are added in larger amount to a raw-material mixture for porous materials containing silicon carbide particles and the like, followed by burning off the pore formers in firing.

However, when porosity is to be increased, the amount of pore former to be added becomes large, in the case where a large amount of organic compound type pore former is added, combustion heat becomes large as well as the amount of gas such as volatile organic substance and carbon dioxide generated in a degreasing (calcinating) stage becomes large. There are instances that the calcinated (degreased) article or fired article obtained under such conditions has cracks, tears and cuts due to gas generation and combustion heat, and defects such as large pores caused by agglomeration of organic pore former added largely, and formation of faulty portions which do not exhibit filter functions and cause leakage of fluid. Also, in the case of using an organic pore former, although the porosity can be increased by an increase in the amount of pore former added, there has been a problem that pore diameter becomes large at the same time.

In order to solve the above-described problems, there is disclosed a method that inorganic micro balloons containing Si and Al and a compound containing alkaline earth metal are added to a raw-material mixture containing silicon carbide particles and metallic silicon, then formed into an intended shape, the resultant green body is calcinated and fired to melt the micro balloons to obtain a porous article of porous structure where an oxide phase containing Si, Al and alkaline earth metal is present on surfaces of and/or at circumferences of the silicon carbide particles and/or the metallic silicon (see Patent Document 3).

However, the method described in Patent Document 3 must add a large amount of alkaline earth metal to melt inorganic micro balloons and form communicating pores, resulting from adding a large amount of alkaline earth metal, there has been a problem that dimensional change becomes large in firing.

Patent Document 1: JP-A-6-182228
Patent Document 2: JP-A-2002-201082
Patent Document 3: WO 2003/082770 A1

DISCLOSURE OF THE INVENTION

The present invention has been made in view of the above-mentioned problems of prior art, which aims at providing a porous article in such way that by firing a raw-material mixture added with inorganic particles, pores generate through volume shrinkage of the inorganic particles, and the shrunk inorganic particles are present per se as an aggregate, thus heat generation and expansion in firing are suppressed, gas (e.g. carbon dioxide) does not generate, which can contribute to productivity and low environmental loading, also increase porosity while maintaining pore diameter at an intended size and a porous article with sharp distribution of pore diameters. As a result, it can provide a silicon carbide-based porous article having high strength, low pressure loss and good dimensional accuracy, and a method for producing the same.

To achieve the above aims, the present invention is to provide a silicon carbide-based porous article described below and a method for producing the same.

[1] A silicon carbide-based porous article comprising silicon carbide particles as an aggregate, metallic silicon and an aggregate derived from siliceous inorganic particles to form pores through volume shrinkage by heat treatment, wherein the porosity is 45 to 70%, and the average pore diameter is 10 to 20 μm.

[2] The silicon carbide-based porous article described in [1], wherein the siliceous inorganic particles are silica gel or zeolite.

[3] The silicon carbide-based porous article described in [1] or [2], wherein, when pore diameters $D_{10}$ and $D_{90}$ correspond to respective pore volumes $V_{10}$ and $V_{90}$ showing 10% and 90% of total pore volume, the value of $\log(D_{90})-\log(D_{10})$ is 0.4 or less in the distribution of pore diameters.

[4] A method for producing a silicon carbide-based porous article, comprising; adding inorganic particles to form pores through volume shrinkage by heat treatment to a raw-material mixture containing silicon carbide particles and metallic silicon, then forming into an intended shape, calcinating and firing the resultant green body, forming pores through volume shrinkage of the inorganic particles by heat treatment, and the shrunk inorganic particles being present as an aggregate in the porous article.

[5] The method for producing the silicon carbide-based porous article described in [4], wherein the inorganic particles are added by 5 to 30 parts by mass.

[6] The method for producing the silicon carbide-based porous article described in [4] or [5], wherein the tap density of the inorganic particles is 0.6 g/cc or less.

[7] The method for producing the silicon carbide-based porous article described in any one of [4] to [6], wherein the average particle diameter of the inorganic particles is 10 to 70 μm, and the pore volume is 0.15 ml/g or more.

[8] The method for producing the silicon carbide-based porous article described in any one of [4] to [7], wherein the inorganic particles are silica gel or zeolite.

[9] The method for producing the silicon carbide-based porous article described in any one of [4] to [8], wherein the amount of alkali metal and/or alkaline earth metal added in the inorganic particles is 1% by mass or less.

[10] The method for producing the silicon carbide-based porous article described in any one of [4] to [9], wherein the intended shape is a honeycomb shape As described above, in the silicon carbide-based porous article and a method for producing the same of the present invention, heat generation and expansion in firing are suppressed, gas (e.g. carbon dioxide) does not generate, which can contribute to productivity and low environmental loading, also increase porosity while maintaining pore diameter at an intended size and obtain a porous article with sharp distribution of pore diameters. As a result, a silicon carbide-based porous article having high strength, low pressure loss and good dimensional accuracy can be obtained.

DESCRIPTION OF REFERENCE NUMERALS

1: silicon carbide particle, 2: metallic silicon, 2a: bonded metallic silicon, 3: siliceous inorganic particle, 3a: shrunk inorganic particle, 4: pore

BEST MODE FOR CARRYING OUT THE INVENTION

The silicon carbide-based porous article of the present invention and the method for producing the same will be described in detail based on specific embodiments below. The present invention is not restricted thereto for interpretation, and it should be construed that various change, modification, improvement can be made based on the knowledge of a person ordinary skill in the art as long as there is no deviation from the scope of the present invention.

A silicon carbide-based porous article according to the present invention comprises silicon carbide particles as an aggregate, metallic silicon and an aggregate derived from siliceous inorganic particles to form pores through volume shrinkage by heat treatment, wherein the porosity is 45 to 70%, and the average pore diameter is 10 to 20 μm. Additionally, the siliceous inorganic particle is not particularly limited, it is more preferably silica gel or zeolite.

Figure 1:
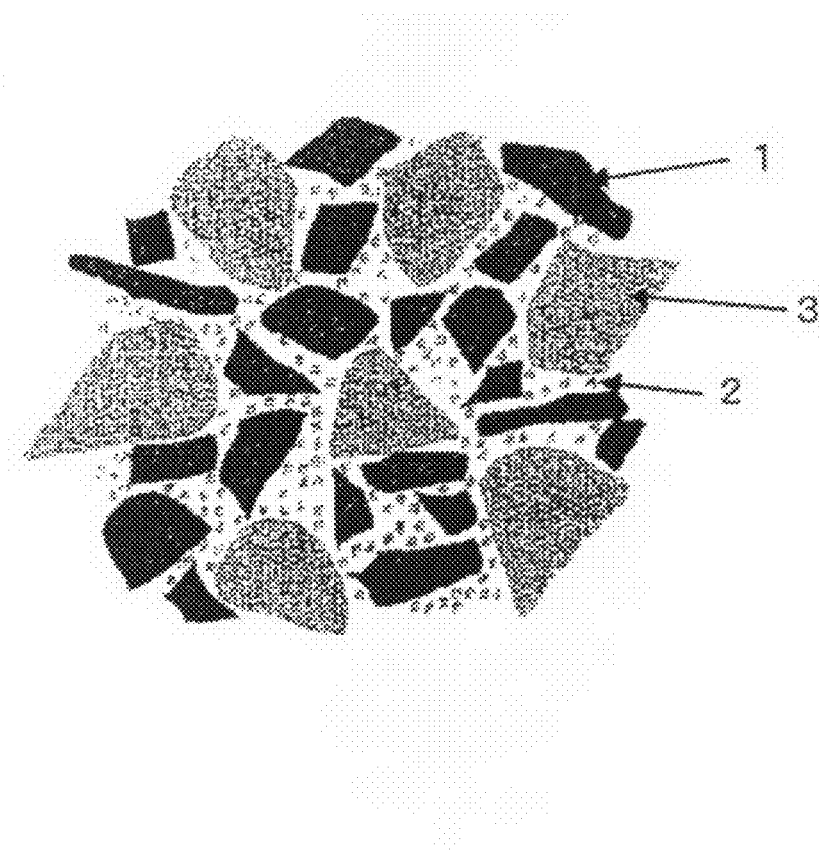
FIG. 1 is a schematic diagram illustrating an internal structure of green body containing silicon carbide particles, metallic silicon and siliceous inorganic particles before heat treatment.

FIG. 1 is a schematic diagram illustrating an internal structure of green body containing silicon carbide particles, metallic silicon and siliceous inorganic particles before heat treatment. As is shown in FIG. 1, for a green body prior to heat treatment, the inside of green body is almost filled up with silicon carbide particles 1, metallic silicon 2 and siliceous inorganic particles 3 to yield a state with few pores.

Figure 2:
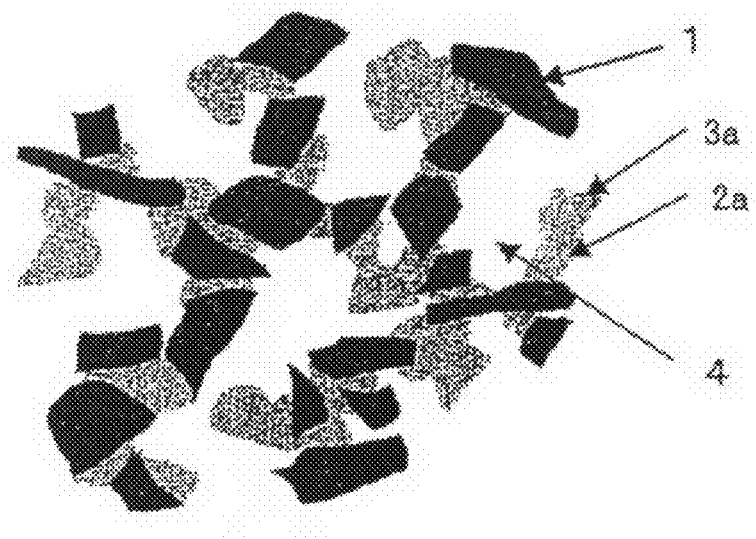
FIG. 2 is a schematic diagram illustrating an internal structure of sintered article containing silicon carbide particles, metallic silicon and siliceous inorganic particles after heat treatment.

On the other hand, FIG. 2 is a schematic diagram illustrating an internal structure of sintered article containing silicon carbide particles, metallic silicon and siliceous inorganic particles after heat treatment. As is shown in FIG. 2, after heat treatment, siliceous inorganic particle 3 shrinks markedly in volume to be a shrunk inorganic particle 3a, particles of metallic silicon 2 bond each other to form bonded metallic silicon particles 2a, simultaneously, bond the silicon carbide particle 1 and shrunk inorganic particle 3a present around them together to form a large pore 4.

As described above, in the silicon carbide-based porous article of the present invention, pores generate through shrinkage of inorganic particles, and the shrunk inorganic particles are present per se as an aggregate, thus, heat generation and expansion in firing are suppressed, gas (e.g. carbon dioxide) does not generate, which can contribute to productivity and low environmental loading, also increase porosity while maintaining pore diameter at an intended size and obtain a porous article with sharp distribution of pore diameters, which can contribute to improvements of high strength, low pressure loss and good dimensional accuracy.

The silicon carbide-based porous article of the present invention preferably has the porosity of 45 to 70%, and the average pore diameter of 10 to 20 μm. When the porosity is less than 45%, or the average pore diameter is less than 10 μm, for a DPF, in particular, a DPF for catalyst regeneration by coating catalyst components in pores afterwards, it is not preferable because the porosity and average pore diameter required for a constitutional porous material to effectively carry the catalyst components cannot be satisfied. Also, when the porosity is more than 70%, or the average pore diameter is more than 20 μm, strength is drastically lowered, which is not preferable because the durability of a DPF, or a DPF for catalyst regeneration becomes insufficient. Additionally, from the viewpoints of maintaining high strength as well as high porosity and low pressure loss, the silicon carbide-based porous article of the present invention has more preferably the porosity of 45 to 65%, and the average pore diameter of 10 to 20 μm, particularly preferably the porosity of 50 to 60%, and the average pore diameter of 10 to 15 μm.

Also, regarding the silicon carbide-based porous article of the present invention, the distribution of pore diameters is sharp, further in detail, when pore diameters $D_{10}$ and $D_{90}$ correspond to respective pore volumes $V_{10}$ and $V_{90}$ showing 10% and 90% of total pore volume, the value of $\log(D_{90})-\log(D_{10})$ is preferably 0.4 or less (more preferably 0.35 or less) in the distribution of pore diameters. Additionally, the smaller the difference between $D_{10}$ and $D_{90}$, the sharper is the distribution of pore diameters Additionally, the values of $D_{10}$ and $D_{90}$ used for evaluation in the present invention depend on the porosity, the higher the porosity, the larger become the values and the difference. Therefore, as an evaluation method for porous articles with different porosities, the difference between $\log(D_{90})$ and $\log(D_{10})$ was adopted for evaluation and the smaller the value of $\log(D_{90})-\log(D_{10})$, the sharper was the distribution of pore diameters in the evaluation.

As described above, since the silicon carbide-based porous article of the present invention can exhibit the characteristic as a material constituting a honeycomb structure for example, as well as it can provide excellent oxidation resistance, acid resistance, reaction resistance against particulate matter and thermal shock resistance, it can be preferably used under high SV (space velocity) as a DPF, DPF for catalyst regeneration, or catalyst carrier.

Next, the method for producing the silicon carbide-based porous article of the present invention will be described. In producing the silicon carbide-based porous article of the present invention, first a raw material mixture containing silicon carbide particles and metallic silicon is prepared. Additionally, silicon carbide particles and metallic silicon sometimes may contain a trace of impurities such as Fe, Al and Ca, they may be used as they are, or after purification by chemical treatment like cleaning with chemicals. To the raw-material mixture prepared, inorganic particles to form pores through volume shrinkage by heat treatment are added, then if necessary, forming auxiliaries such as organic binders are added thereto, mixed and kneaded to obtain a clay for forming. The clay thus obtained is formed into an intended form (e.g. honeycomb shape), the resultant green body is calcinated to remove (degrease) organic binders in the green body, firing is then conducted to give a silicon carbide-based porous article.

The main feature of the method for producing the silicon carbide-based porous article of the present invention is the addition of inorganic particles to form pores through volume shrinkage by heat treatment.

The method for producing the silicon carbide-based porous article of the present invention thereby can increase the amount of pore formers added in yielding high porosity by using the inorganic particles because of no burning and blowing off in firing, in comparison with the method that organic pore formers are mainly used as pore former, the porosity can be increased while maintaining pore diameter at an intended size to give a porous article with sharp distribution of pore diameters. Also, it can greatly suppress or eliminate a large amount of gas generation such as organic volatile substance and carbon dioxide in degreasing (calcinating) stage and combustion heat, which can suppress the generation of cracks, tears and cuts, generation of large pores resulting from agglomeration of pore formers as well, there can be obtained a silicon carbide-based porous article having high strength, low pressure loss and good dimensional accuracy.

The inorganic particle used in the present invention is not particularly limited as long as the above requirements are satisfied, it is preferably silica gel or zeolite which has high pore volume and is ordinarily used as fillers for absorbent and various kinds of materials.

The silica gel used in the present invention is mainly composed of $SiO_2$, even when it contains $Na_2O$ or $Al_2O_3$ as impurity, it can be used without problem because of small amount of the impurity.

The zeolite used in the present invention is a generic name of aluminosilicate with a network structure having a large variety of pore structures and compositions. Generally corresponding to trivalent Al, it contains various kinds of ions, sometimes contains alkali metals such as Na and K, and alkaline earth metals. In the case of using zeolite particles containing such alkali metals and alkaline earth metals, there are instances that zeolite itself melts by heat treatment not to exhibit pore-forming function, so that it is desirable to control the content of alkali metal and alkaline earth metal.

Additionally, in the inorganic particles used in the present invention, the amount of alkali metal and/or alkaline earth metal added is preferably 1% by mass or less (more preferably 0.5% by mass). The reason is that when the amount of alkali metal and/or alkaline earth metal added is as large as 1% by mass or more, the inorganic particle itself melts so remarkably by heat treatment that the melted inorganic particle cannot be present in an aggregate form. Also in this case, dimensional change becomes large in heat treatment, there are instances that carbide-based porous article with good dimensional accuracy cannot be obtained.

Also, in the method for producing the silicon carbide-based porous article of the present invention, the above inorganic particles are preferably added by 5 to 30 parts by mass (more preferably 10 to 30 parts by mass) relative to 100 parts by mass of the total amount of silicon carbide particle and metallic silicon. When the addition of the inorganic particles is less than 5 parts by mass, pore forming effect cannot be exhibited, whereas when the addition of the inorganic particles is more than 30 parts by mass, the amount of aggregate formed through shrinkage of the inorganic particles becomes too much, bonded part by metallic silicon decreases, which may damage the strength as silicon carbide-based porous article.

Additionally, in the method for producing the silicon carbide-based porous article of the present invention, to further enhance porosity, organic pore formers can be concomitantly used, it is necessary to consider the kind of organic pore former used and the amount added not to deteriorate the characteristics of silicon carbide-based porous article.

Further, in the method for producing the silicon carbide-based porous article of the present invention, tap density of inorganic particles is preferably 0.6 g/cc or less. The reason is that even in a large pore volume and bulky state of inorganic particle itself, when the particle diameter is small, packing between particles takes place, the tap density becomes high, thus the effect as pore former is lowered. On the other hand, when the particle diameter is large, it is possible to increase filling volume, but, in the case where particle itself is a solid core form, the tap density becomes too high. From the above viewpoints, it is possible to select an inorganic particle for forming pores effectively in a silicon carbide-based porous article by controlling the tap density.

Additionally, tap density is bulk density measured by a tap method, a graduated cylinder filled with sample powders of a certain amount is repeatedly dropped from a certain distance, the bulkiness reached to a constant value is measured to be able to use as indexes showing the particle diameter and the bulkiness of particles themselves (pore volume, true density).

In the method for producing the silicon carbide-based porous article of the present invention, the average particle diameter of inorganic particles is preferably 10 to 70 μm (more preferably 30 to 65 μm). The reason is that a honeycomb structure with partition walls of about 300 μm in thickness can be surely extruded. Further, the lower limit of average diameter of inorganic particles depends on the size of silicon carbide particle as aggregate, the particles are filled up between silicon carbide particles and lose the function as pore former when it is too small compared to the size of silicon carbide particle. Additionally, when an inorganic particle with a desired particle diameter is not commercially available, there may be used particles that a commercially available particle is crushed into a desired size, or a commercially available particle is granulated using a small amount of organic binder (e.g. aqueous PVA solution).

Also, in the method for producing the silicon carbide-based porous article of the present invention, the pore volume of inorganic particle is preferably 0.15 ml/g or more. Additionally, the pore volume is a void that the inorganic particle itself contains in the particle, which is generated through the shrinkage by heat treatment. It is possible to enlarge the amount of void by the particle with a large pore volume in the same weight, and enlarge the amount of pore generated through shrinkage.

Further, in the method for producing the silicon carbide-based porous article of the present invention, calcination is preferably conducted at lower temperatures than melting temperature of metallic silicon. Specifically, it may be once held at a given temperature of about 150 to 700° C., further it may be carried out at as low raising temperature speed of 50° C./hr or smaller in a given temperature. Herein, regarding a technique of once holding at a given temperature, the temperature may be maintained at only one temperature level or a plurality of temperature levels depending on the kind of organic binders used and the amount thereof, further, in the case of maintaining at a plurality of temperature levels, the holding time may be the same or different each other. Also, regarding a technique of slow raising temperature speed, the speed may be slowed only in a temperature region, or in a plurality of temperature regions, further in the case of plural regions, the speeds may be the same or different each other.

Next, in the method for producing the silicon carbide-based porous article of the present invention, to make a silicon carbide-based article obtained to be a porous structure that fire resistant particles therein are bonded by metallic silicon, it is necessary to soften metallic silicon in firing. Since the melting point of metallic silicon is 1410° C., firing temperature in firing is preferably 1410° C. or more. The optimum temperature is further determined from microstructure and characteristic. However, when the temperature exceeds 1600° C., evaporation of metallic silicon proceeds, and bonding through metallic silicon becomes difficult, then the firing temperature is suitably 1410 to 1600° C., preferably 1420 to 1580° C. Also, silicon dioxide and metal elements such as alkaline earth may be added to improve bonding between silicon carbide particle and metallic silicon in firing.

EXAMPLES

The present invention will be described more specifically by way of Examples, however the present invention is in no way restricted to these Examples.

Example 1

A SiC raw material powder and a Si powder having an average particle diameter of 5 μm were compounded for the composition to be 80:20 by mass, to the resultant powder of 100 parts by mass was added 15 parts by mass of silica gel having an average particle diameter of 43 μm (other characteristics are also shown in Table 1). Then, 6 parts by mass of methyl cellulose as organic binder, 2.5 parts by mass of surfactant and 24 parts by mass of water were added thereto, uniformly mixed and kneaded to give a clay for forming. The resultant clay was formed by an extruder, dried to give a silicon carbide-based porous article having a partition wall thickness of 310 μm, a cell density of about 46.5 cells/cm$^2$ (300 cells/in.$^2$), regular tetragon in section of one side of 35 mm and a length of 152 mm. The green body of silicon carbide-based porous article was plugged in both end faces for the end surface to be a checkered pattern. Namely, the adjacent cells are plugged each other in the ends of opposite sides. As plugging material, a material similar to the raw material of silicon carbide-based porous article was used. The both end faces of cell were plugged, dried, then degreased at about 400° C. in ambient atmosphere, thereafter, fired at about 1450° C. in Ar inert atmosphere, thereby to produce a silicon carbide-based porous article.

Example 2

It was conducted in the same manner as in Example 1 except that the amount of silica gel added was 5 parts by mass and auxiliary component (SrO) shown in Table 1 was further added in Example 1.

Example 3 and Example 4

They were conducted in the same manner as in Example 2 except that the amount of silica gel was 25 parts by mass (Example 3) and 30 parts by mass (Example 4) in Example 2.

Example 5

It was conducted in the same manner as in Example 1 except that a silica gel with an average particle diameter of 40 μm was used in Example 1.

Example 6

It was conducted in the same manner as in Example 1 except that a silica gel with an average particle diameter of 13 μm was used in Example 1.

Example 7

It was conducted in the same manner as in Example 6 except that auxiliary component (SrO) shown in Table 1 was further added in Example 6.

Example 8

It was conducted in the same manner as in Example 1 except that a silica gel with an average particle diameter of 7 μm was used in Example 1.

Example 9

It was conducted in the same manner as in Example 1 except that a silica gel with an average particle diameter of 65 μm was used in Example 1. However, the silica gel was ground to an average particle diameter of 65 μm for use.

Example 10

It was conducted in the same manner as in Example 1 except that 10 parts by mass of starch as organic pore former was further added in Example 1.

Example 11

It was conducted in the same manner as in Example 9 except that 5 parts by mass of starch as organic pore former was further added in Example 9.

Example 12

It was conducted in the same manner as in Example 1 except that zeolite with an average particle diameter of 20 μm (H type mordenite) was used in Example 1.

Example 13

It was conducted in the same manner as in Example 1 except that zeolite with an average particle diameter of 6 μm (H type USY (ultra-stable Y-zeolite)) was used in Example 1.

Example 14

It was conducted in the same manner as in Example 1 except that zeolite with an average particle diameter of 18 μm (K type ferrielite) was used in Example 1.

Example 15

It was conducted in the same manner as in Example 1 except that zeolite with an average particle diameter of 45 μm (H type mordenite) was used in Example 1. However, no zeolite with a desired particle diameter was available, the zeolite powder used in Example 11 and 5% PVA solution were blended, granulated and dried to be an average particle diameter of 45 μm for use.

Comparative Example 1

It was conducted in the same manner as in Example 1 except that no silica gel was added in Example 1.

Comparative Example 2

It was conducted in the same manner as in Comparative Example 1 except that auxiliary components (SrO, $SiO_2$) shown in Table 1 were further added in Comparative Example 1.

Comparative Examples 3 to 5

They were conducted in the same manner as in Comparative Example 2 except that starch as organic pore former was added by 10 parts by mass (Comparative Example 3), 20 parts by mass (Comparative Example 4), and 25 parts by mass (Comparative Example 5) in Comparative Example 2.

Comparative Example 6

It was conducted in the same manner as in Example 1 except that fly ash balloon with an average particle diameter of 58 μm was used in Example 1.

Comparative Example 7

It was conducted in the same manner as in Example 1 except that shirasu balloon with an average particle diameter of 20 μm was used in Example 1.

The inorganic particles used and the resultant silicon carbide-based porous articles (Examples 1 to 15 and Comparative Examples 1 to 7) were evaluated in the following methods. The results are shown in Tables 1 and 2.

Evaluation Method of Inorganic Particle (Pore Former)

(1) Particle diameter: an average particle diameter was measured using a laser diffraction/scattering type particle size analyzer.

(2) Tap density: the sample powder of known weight was filled in a graduated cylinder, repeatedly dropped from a certain distance, the volume when the bulkiness became constant was measured to determine a tap density.

(3) Pore volume: it was measured by a constant volume type gas absorption method.

(4) Chemical composition: compositions were quantitatively determined with an ICP atomic emission spectrometry. The results are shown in Table 1. as an amount of oxide.

Evaluation Method of Fired Article (1) Porosity: a plate with partition wall thickness was cut out from the silicon carbide-based porous article obtained, which was measured in the Archimedes' method.

(2) Average pore diameter and pore volume: a test sample was cut out from the silicon carbide-based porous article obtained, which was measured with a mercury porosimeter.

(3) Sharpness evaluation of pore diameter distribution: From the results measured with a mercury porosimeter, the total pore volume, 10% ($V_{10}$) and 90% ($V_{90}$) volumes of the total pore volume were calculated. Pore diameters of $D_{10}$ and $D_{90}$ corresponding to $V_{10}$ and $V_{90}$, respectively were calculated from the relationship between pore diameter and integrated pore volume.

(4) Rate of dimensional change: it shows a dimensional change before and after firing, it is calculated in the following formula:

$$\text{Rate of dimensional change} = (\text{dimension before firing})/(\text{dimension after firing})$$

TABLE 1

| | | Inorganic pore former | | | Compositions | | | | | Organic pore former Type (ms %) |
|---|---|---|---|---|---|---|---|---|---|---|
| | Type | Particle diameter μm | Pore volume ml/g | Tap density g/cc | SiO₂ Mass % | Al₂O₃ Mass % | Alkaline, Alkaline earth Mass % | Amount of pore former Mass % | Auxiliary Type (ms %) | |
| Example 1 | Silica gel | 43 | 0.75 | 0.50 | 99.7 | | 0.05 (Na₂O) | 15 | — | — |
| Example 2 | | | | | | | | 5 | SrO (2.0) | — |
| Example 3 | | | | | | | | 25 | SrO (2.0) | — |
| Example 4 | | | | | | | | 30 | SrO (2.0) | — |
| Example 5 | Silica gel | 40 | 1.57 | 0.43 | 99.8 | 0.1 | 0.02 (Na₂O) 0.03 (MgO) 0.06 (CaO) | 115 | — | — |
| Example 6 | Silica gel | 13 | 1.65 | 0.52 | 99.8 | 0.1 | 0.02 (Na₂O) 0.03 (MgO) 0.06 (CaO) | 15 | — | — |
| Example 7 | | | | | | | | 15 | SrO (2.0) | — |
| Example 8 | Silica gel | 7 | 1.6 | 0.58 | 99.8 | | 0.02 (Na₂O) 0.03 (MgO) 0.06 (CaO) | 15 | — | — |
| Example 9 | Silica gel | 65 (ground) | 0.75 | 0.47 | 99.7 | | 0.05 (Na₂O) | 15 | | — |
| Example 10 | Silica gel | 43 | 0.75 | 0.50 | 99.7 | | 0.05 (Na₂O) | 15 | | Starch (10) |
| Example 11 | Silica gel | 65 (ground) | 0.75 | 0.47 | 99.7 | | 0.05 (Na₂O) | 15 | | Starch (5) |
| Example 12 | Zeolite H/MOR | 20 | 0.16 | 0.59 | 90.2 | 9.3 | 0.5 (Na₂O) | 15 | — | — |
| Example 13 | Zeolite H/USY | 6 | 0.38 | 0.63 | 95.7 | 4.2 | 0.05 (Na₂O) | 15 | — | — |
| Example 14 | Zeolite K/FER | 18 | 0.15 | 0.60 | 85.2 | 7.9 | 1.3 (Na₂O) 5.6 (K₂O) | 15 | — | — |
| Example 15 | Zeolite H/MOR | 45 (granulation) | 0.16 | 0.51 | 90.2 | 9.3 | 0.5 (Na₂O) | 15 | — | — |
| Comp. Exam. 1 | | | | | | | | — | — | — |
| Comp. Exam. 2 | | | | | | | | — | SrO (2.0) SiO₂ (1.0) | — |
| Comp. Exam. 3 | | | | | | | | — | SrO (2.0) SiO₂ (1.0) | Starch (10) |
| Comp. Exam. 4 | | | | | | | | — | SrO (2.0) SiO₂ (1.0) | Starch (20) |
| Comp. Exam. 5 | | | | | | | | — | SrO (2.0) SiO₂ (1.0) | Starch (25) |
| Comp. Exam. 6 | Fly ash balloon | 58 | hollow dense article | 0.40 | 54.1 | 32.2 | 1.11 (Na₂O) 1.49 (MgO) 4.60 (K₂O) 0.37 (CaO) | 15 | — | — |
| Comp. Exam. 7 | Shirasu balloon | 20 | hollow dense article | 0.36 | 76.0 | 13.4 | 1.57 (Na₂O) 0.46 (MgO) 2.92 (K₂O) 2.40 (CaO) | 15 | — | — |

TABLE 2

| | Characteristics of fired article | | | | | Sharpness evaluation of pore 10 to 90%, | | | |
|---|---|---|---|---|---|---|---|---|---|
| | Rate of dimensional change — | Porosity % | Average pore diameter μm | Pore volume ml/g | 10% pore volume (V₁₀) ml/g | 90% pore volume (V₉₀) ml/g | 10% pore diameter (D₁₀) μm | 90% pore diameter (D₉₀) μm | range of pore diameter μm | log (D₉₀)-log (D₁₀) |
| Example 1 | 1.00 | 57.1 | 13.9 | 0.45 | 0.05 | 0.41 | 7.9 | 17.6 | 9.7 | 0.35 |
| Example 2 | 1.02 | 48.7 | 10.5 | 0.30 | 0.03 | 0.27 | 5.2 | 11.9 | 6.7 | 0.36 |
| Example 3 | 1.02 | 51.0 | 14.0 | 0.39 | 0.04 | 0.35 | 7.7 | 17.3 | 9.6 | 0.35 |
| Example 4 | 1.02 | 51.6 | 13.2 | 0.42 | 0.04 | 0.38 | 7.7 | 15.9 | 8.2 | 0.32 |
| Example 5 | 1.02 | 55.2 | 13.5 | 0.43 | 0.04 | 0.38 | 8.4 | 18.2 | 9.8 | 0.34 |
| Example 6 | 1.02 | 48.5 | 10.1 | 0.35 | 0.04 | 0.32 | 5.6 | 12.5 | 6.9 | 0.35 |
| Example 7 | 1.02 | 44.8 | 10.5 | 0.31 | 0.03 | 0.28 | 5.8 | 11.8 | 6.0 | 0.31 |
| Example 8 | 1.05 | 41.9 | 8.3 | 0.30 | 0.03 | 0.27 | — | — | — | — |
| Example 9 | 1.01 | 60.3 | 14.7 | 0.49 | 0.05 | 0.44 | 9.5 | 19.7 | 10.2 | 0.32 |
| Example 10 | 1.01 | 62.5 | 14.5 | 0.50 | 0.05 | 0.45 | 9.7 | 21.3 | 11.6 | 0.34 |
| Example 11 | 1.01 | 64.8 | 15.1 | 0.51 | 0.05 | 0.46 | 9.9 | 23.5 | 13.6 | 0.38 |
| Example 12 | 1.01 | 50.1 | 10.7 | 0.31 | 0.03 | 0.28 | 6.7 | 15.0 | 8.3 | 0.35 |
| Example 13 | 1.03 | 42.7 | 6.3 | 0.27 | 0.03 | 0.24 | — | — | — | — |

TABLE 2-continued

| | Characteristics of fired article | | | | Sharpness evaluation of pore | | | | |
| --- | --- | --- | --- | --- | --- | --- | --- | --- | --- |
| | | | | | | | | 10 to 90%, | |
| | Rate of dimensional change — | Porosity % | Average pore diameter μm | Pore volume ml/g | 10% pore volume ($V_{10}$) ml/g | 90% pore volume ($V_{90}$) ml/g | 10% pore diameter ($D_{10}$) μm | 90% pore diameter ($D_{90}$) μm | range of pore diameter μm | log ($D_{90}$)-log ($D_{10}$) |
| Example 14 | 1.06 | 42.1 | 10.9 | 0.25 | 0.02 | 0.22 | — | — | — | — |
| Example 15 | 1.02 | 53.9 | 12.8 | 0.37 | 0.04 | 0.33 | 8.6 | 17.4 | 8.8 | 0.31 |
| Comp. Exam. 1 | 1.01 | 42.1 | 8.0 | 0.22 | 0.02 | 0.20 | 5.4 | 8.9 | 3.5 | 0.22 |
| Comp. Exam. 2 | 1.03 | 40.3 | 9.6 | 0.21 | 0.02 | 0.19 | 7.3 | 10.3 | 3.0 | 0.15 |
| Comp. Exam. 3 | 1.03 | 48.8 | 10.9 | 0.31 | 0.03 | 0.28 | 4.6 | 12.3 | 7.7 | 0.43 |
| Comp. Exam. 4 | 1.03 | 60.0 | 19.9 | 0.48 | 0.05 | 0.43 | 9.3 | 25.1 | 15.8 | 0.43 |
| Comp. Exam. 5 | 1.03 | 62.6 | 22.1 | 0.56 | 0.06 | 0.50 | 10.5 | 28.1 | 17.6 | 0.43 |
| Comp. Exam. 6 | 1.05 | 51.1 | 15.9 | 0.32 | 0.03 | 0.28 | 8.6 | 23.0 | 14.4 | 0.43 |
| Comp. Exam. 7 | 1.07 | 45.8 | 14.0 | 0.31 | 0.03 | 0.28 | 4.9 | 12.8 | 7.9 | 0.42 |

Discussions

Examples 1 to 15 and Comparative Examples 1 to 7

From the results of Tables 1 and 2, the inorganic particles used in Examples 1 to 7, 9 to 12 and 15 have a tap density of 0.6 g/cc or less and average particle diameter of 10 to 70 μm, and satisfy the pore volume of 0.15 ml/g or more and the content of alkali/alkaline earth metal of 1% by mass or less. By adding these inorganic particle of 5 to 30% by mass (ms %), a silicon carbide-based porous article with a porosity of 45 to 70% and an average pore diameter of 10 to 20 μm was able to be produced (Examples 1 to 7, 9 to 12 and 15). Also, in the silicon carbide-based porous article obtained (Examples 1 to 7, 9 to 12 and 15), since the aggregate of shrunk inorganic particles was left, in comparison with the case pore-formed with organic pore formers (Comparative Examples 3 to 5), the distribution of pore diameters was sharp, i.e., the value of log($D_{90}$) minus log($D_{10}$) became smaller than that of Comparative Example. Further, excellent result was able to be obtained even in the case where the inorganic particles and organic pore former were in concomitant use (Examples 10 and 11). Additionally, in the case where no inorganic particle with a desired particle size is available, the excellent result was able to be obtained using suitably ground or granulated one (Examples 9, 11 and 15).

On the other hand, in the case of using a pore former with a small particle diameter (10 μm or less) (Examples 8 and 13), the porosity was about 42% and at the same level as the case with no addition of pore former (Comparative Example 1), so there was no pore forming effect. It was also known that in the case of containing a large amount of alkali/alkaline metal in an inorganic particle (1% by mass or more; Example 14, Comparative Examples 6 and 7), Rate of dimensional change in firing was high, causing a serious problem in production. Further, in Comparative Examples 6 and 7, in spite of exhibiting pore forming function, the distribution of pore diameters was not sharp, i.e., the value of log($D_{90}$) minus log($D_{10}$) became large in comparison with the case added with inorganic particles to form through the shrinkage. The reason is that the inorganic particles melt and are present at peripheries of silicon carbide particles and metallic silicon particles, but not present in the aggregate form.

INDUSTRIAL APPLICABILITY

The silicon carbide-based porous article and the production method of the present invention can be preferably used in production of trapping filters for exhaust gas, particularly, a diesel particulate filter (DPF) trapping particulate substance (particulate) in exhaust gas of diesel engine.

The invention claimed is:

1. A silicon carbide-based porous article comprising:
   silicon carbide particles as an aggregate, metallic silicon, and
   shrunken siliceous inorganic particles that are shrunken from an aggregate derived from siliceous inorganic particles to form pores through volume shrinkage by heat treatment,
   wherein the silicon carbide-based porous article has a porosity between 45 and 70%, and an average pore diameter between 10 and 20 μm,
   wherein the inorganic particles contain alkali metal and/or alkaline earth metal, and an amount of the alkali metal and/or alkaline earth metal in the inorganic particles is 1% by mass or less.

2. The silicon carbide-based porous article of claim 1, wherein the siliceous inorganic particles are silica gel or zeolite.

3. The silicon carbide-based porous article of claim 1, wherein, when pore diameters $D_{10}$ and $D_{90}$ correspond to respective pore volumes $V_{10}$ and $V_{90}$ showing 10% and 90% of total pore volume, the value of log($D_{90}$) minus log($D_{10}$) is 0.4 or less in the distribution of pore diameters.

* * * * *